United States Patent
Hampe et al.

(10) Patent No.: US 11,377,301 B2
(45) Date of Patent: Jul. 5, 2022

(54) MOTOR-OPERATED CONVEYOR ROLLER WITH INTEGRATED CONTROLLER

(71) Applicant: Interroll Holding AG, Sant' Antonino (CH)

(72) Inventors: Andreas Hampe, Hückelhoven (DE); Herbert Henze, Hückelhoven (DE)

(73) Assignee: Interroll Holding aG, Sant' Antonino (CH)

(*) Notice: Subject to any disclaimer, the term of this patent is extended or adjusted under 35 U.S.C. 154(b) by 0 days.

(21) Appl. No.: 17/312,026

(22) PCT Filed: Dec. 19, 2019

(86) PCT No.: PCT/EP2019/086241
§ 371 (c)(1),
(2) Date: Jun. 9, 2021

(87) PCT Pub. No.: WO2020/127686
PCT Pub. Date: Jun. 25, 2020

(65) Prior Publication Data
US 2022/0024693 A1    Jan. 27, 2022

(30) Foreign Application Priority Data
Dec. 21, 2018  (DE) ............... 10 2018 133 478.8

(51) Int. Cl.
*B65G 23/08*    (2006.01)
*B65G 13/06*    (2006.01)
(Continued)

(52) U.S. Cl.
CPC ............ *B65G 23/08* (2013.01); *B65G 13/06* (2013.01); *B65G 43/00* (2013.01); *H02P 23/0077* (2013.01); *B65G 2811/095* (2013.01)

(58) Field of Classification Search
CPC ........ B65G 23/08; B65G 13/06; B65G 43/00; H02P 23/0077
See application file for complete search history.

(56) References Cited

U.S. PATENT DOCUMENTS

| 4,419,734 A * | 12/1983 | Wolfson | ............... | G06K 17/00 |
|---|---|---|---|---|
| | | | | 700/214 |
| 7,777,440 B2 * | 8/2010 | Nagai | ............... | B65G 43/02 |
| | | | | 318/434 |

(Continued)

FOREIGN PATENT DOCUMENTS

| DE | 10131019 A1 | 12/2002 |
|---|---|---|
| DE | 202012005380 U1 | 9/2013 |

(Continued)

*Primary Examiner* — Gene O Crawford
*Assistant Examiner* — Lester Rushin, III
(74) *Attorney, Agent, or Firm* — Michael Soderman

(57) ABSTRACT

The invention relates to a motorized conveyor roller, comprising a roller body mounted so as to be able to rotate about a roller axle, a drive unit arranged inside the roller body and designed to generate a rotational movement about the roller axle between an axle element and the roller body. The invention is characterized by a control unit that is arranged inside the roller body and that is designed to receive a state signal from outside the roller body, to generate a control signal that describes a drive characteristic on the basis of the state signal, to control the drive unit by way of the control signal, to generate a self state signal that describes the state signal and/or the drive characteristic, and to transmit this self state signal outside the roller body.

15 Claims, 3 Drawing Sheets

(51) Int. Cl.
*B65G 43/00* (2006.01)
*H02P 23/00* (2016.01)

(56) References Cited

U.S. PATENT DOCUMENTS

| | | | |
|---|---|---|---|
| 8,757,363 B2* | 6/2014 | Combs | G05B 19/4189 |
| | | | 198/781.01 |
| 9,490,738 B2* | 11/2016 | Nondahl | H02M 1/126 |
| 10,093,487 B2* | 10/2018 | Ramezani | B65G 23/08 |
| 2003/0168316 A1 | 9/2003 | Knepple et al. | |
| 2017/0305676 A1* | 10/2017 | Ramezani | H02K 7/14 |

FOREIGN PATENT DOCUMENTS

| | | |
|---|---|---|
| DE | 102016120415 A1 | 4/2018 |
| DE | 102016124689 A1 | 6/2018 |
| JP | 2004026503 A | 1/2004 |
| WO | 2012154650 A1 | 11/2012 |
| WO | 2018024917 A2 | 2/2018 |

* cited by examiner

MOTOR-OPERATED CONVEYOR ROLLER WITH INTEGRATED CONTROLLER

CROSS REFERENCE TO RELATED APPLICATIONS

This application is the U.S. national stage of International Application No. PCT/EP2019/086241, filed on Dec. 19, 2019. The international application claims the priority of DE 102018133478.8 filed on Dec. 21, 2018; all applications are incorporated by reference herein in their entirety.

BACKGROUND

The invention relates to a motorized conveyor roller comprising a roller body mounted so as to be able to rotate about a roller axle, a drive unit arranged inside the roller body and designed to generate a rotational movement about the roller axle between an axle element and the roller body, and a control unit that is designed to receive a control signal and to control the drive unit, on the basis of the control signal, so as to perform driving with a characteristic predetermined by the control signal.

Motorized conveyor rollers of this structural type are used in conveyor arrangements. Multiple motorized conveyor rollers are often installed in this case in a conveyor system. The conveyor system is in this case often formed from multiple conveying zones that are run through in succession by an object to be conveyed. Each conveying zone in this case has at least one motorized conveyor roller. By virtue of this type of structure, multiple objects are able to be conveyed simultaneously in the conveying device and contact between these objects in the process is able to be avoided by virtue of the motorized conveyor rollers in the individual conveying zones being driven accordingly. This achieves what is known as zero pressure accumulation conveying, which is nowadays striven for in many applications in order to guarantee high certainty against the conveyed material being damaged.

It is thus known for example to control a motorized conveyor roller in a zero pressure accumulation manner in single discharge mode. In this operating mode, the conveyor roller is controlled only so as to convey an object in its conveying zone when the adjacent conveying zone located downstream is free. Another zero pressure accumulation mode of operation is what is known as block discharge mode. In block discharge mode, all of the motorized conveyor rollers along adjacent conveying zones are controlled simultaneously, such that, even in the case of adjacent conveying zones occupied by objects, contact-free conveying is possible, since the conveying zone into which an object is conveyed at the same time conveys out the object that was previously in this conveying zone.

Various control systems are already known for controlling the motorized conveyor rollers in such conveyor devices. In principle, control systems in which all motorized conveyor rollers are controlled by a superordinate central control unit (for example in the form of a PLC) are already known. In this kind of control system, it is necessary to set up corresponding data transmissions from the conveying zones to the central control unit and from the central control unit to the conveying zones in order to ensure the required information status in the central control unit and in order to route the corresponding control commands from the central control unit to the individual motorized conveyor rollers in the conveying zones. Such systems are known both as an individual connection from each conveying zone to the central control unit and in the form of bus-based systems.

Also known are control systems in which one or two motorized conveyor rollers are linked to a decentralized control unit arranged adjacent to these conveyor rollers and several such decentralized control units are arranged accordingly along the conveyor device. These control units distributed locally along the conveying path are in this case coupled to one another so as to transmit signals among one another. This coupling may be restricted to respectively adjacent control units (what is called peer-to-peer connection), such that each control unit receives signals only from the control unit located upstream and downstream thereof and is able to transmit same thereto. In this case too, bus-based systems in which the control units are connected to one another by a signal bus line are also known.

One disadvantage of the direct peer-to-peer connection of respectively adjacent control units is the considerable cabling expenditure that this entails. This is able to be improved through a bus signal transmission. One disadvantage of previously known systems, whether these are centrally controlled systems or systems controlled in a decentralized manner, is that more complex functionalities are able to be achieved only through complex programming of the control units, and the control units have to be installed separately for this purpose and have to be connected to specific motorized conveyor rollers in a targeted manner and, when a control unit or a connecting line from the control unit to the motorized conveyor roller is damaged, this may result in overall failure of the conveyor device. This may also be rectified only with complex installation measures. Against this background, the general aim is to allow logic programming of the conveying sequences in a simple and reliable manner and to arrange the control units and control lines necessary for this in a manner that is as far as possible better protected against damage.

This object is achieved by a motorized conveyor roller of the type described at the outset, which is developed by way of a control unit that is arranged inside the roller body and that is designed to receive a state signal from outside the roller body, to generate a control signal that describes a drive characteristic on the basis of the state signal, to control the drive unit by way of the control signal, to generate a self state signal that describes the state signal and/or the drive characteristic, and to transmit this self state signal outside the roller body.

SUMMARY

The invention relates to a motorized conveyor roller, comprising a roller body mounted so as to be able to rotate about a roller axle, a drive unit arranged inside the roller body and designed to generate a rotational movement about the roller axle between an axle element and the roller body. The invention is characterized by a control unit that is arranged inside the roller body and that is designed to receive a state signal from outside the roller body, to generate a control signal that describes a drive characteristic on the basis of the state signal, to control the drive unit by way of the control signal, to generate a self state signal that describes the state signal and/or the drive characteristic, and to transmit this self state signal outside the roller body.

DETAILED DESCRIPTION

By virtue of the motorized conveyor roller according to the invention, firstly the control unit is arranged inside the roller body and is in this case designed to receive a state signal from outside the roller body. This state signal may be for example a sensor signal, and the control unit is designed to control the drive unit on the basis of this state signal. A control unit fully designed to autonomously control the conveying process by the motorized conveyor roller on the basis of an externally supplied state signal is therefore arranged inside the roller body. By virtue of the motorized conveyor roller, an autonomous conveying process is therefore able to be performed along an entire conveying path by programming the control unit in an appropriate manner, in which for example the drive unit is controlled on the basis of a supplied sensor signal and a conveying logic is thereby able to be controlled autonomously.

The motorized conveyor roller according to the invention therefore does not require any external control unit arranged outside the roller body and to which it is connected and from which it receives control commands. Rather, the conveyor roller according to the invention is designed to independently perform a control sequence on the basis of state data, that is to say to implement the movement of the motorized conveyor roller on the basis of these supplied sensor data.

The control unit within the roller body is first of all well protected against damage and allows a direct connection, which is established when the motorized conveyor roller is manufactured, to the drive unit in order to control same. The control unit is at the same time designed such that it receives a state signal from outside the roller body. This state signal may for example be a sensor signal from a sensor arranged inside the conveyor device in which the motorized conveyor roller is used.

The control unit is furthermore designed to generate a self state signal and to transmit it out of the roller body. This self state signal processing makes it possible to externally signal the operating state of the conveyor roller or the signals defining the operating state, such that other components incorporated into the conveying are able to define their control behavior using these self state signals. The data exchange of self state signals, in which a self state signal of one roller may become a state signal of another roller, thereby allows autonomous control of the individual conveyor rollers in a conveyor system, with fully implemented control intelligence, without a central or decentralized control unit outside the conveyor roller being necessary for this purpose.

The state signal may also be a signal that originates from a conveyor roller arranged adjacent to the motorized conveyor roller and signals the operating state of this adjacent conveyor roller. The control unit may thus be designed to receive, as state signal, a self state signal from the conveyor roller located upstream or downstream (or both): this self state signal may signal whether these adjacent motorized conveyor rollers are being driven or are stationary.

The state signal may however also contain logic information that goes beyond this; by way of example, signals may be received from the adjacent conveyor roller, that is to say the conveyor roller located upstream or downstream, or both, that were in turn received as a state signals by these adjacent conveyor rollers, that is to say for example signals that were supplied to one of these adjacent conveyor rollers as a sensor signal and that the control unit of this conveyor roller in turn forwards to the control unit of the motorized conveyor roller.

The control unit of the motorized conveyor roller may accordingly in particular also be designed to generate a self state signal that characterizes an operating state of the drive unit and/or that characterizes a sensor signal received as state signal and to transmit it out of the roller body such that this self state signal is able to be transmitted to an adjacent motorized conveyor roller and is able to be received by the control unit there. This transmission of self state signals between two adjacent rollers in both directions is advantageous in particular when both motorized conveyor rollers are designed according to the invention and have a correspondingly equipped and designed control unit within the roller body. The two adjacent motorized conveyor rollers may thereby execute an autonomous sequence of the conveying process without the need for an external control unit outside the roller body with the accordingly required transmission of signals to and from this external control unit.

Provision is particularly preferably made here according to the invention for the self state signal and the state signal to each have a predetermined data structure and for the data structure of the self state signal and of the state signal to be identical. This allows a conveying path to be constructed by way of the motorized conveyor roller, this conveying path comprising multiple motorized conveyor rollers of matching design according to the invention, and these motorized conveyor rollers are coupled to one another for signal transmission purposes such that the respective control units arranged inside the roller body receive state signals in the form of self state signals sent from other motorized conveyor rollers and control the drive unit of their own motorized conveyor roller on the basis of these received self state signals from the other motorized conveyor rollers. At the same time, the control unit of the motorized conveyor roller may generate and send a self state signal that characterizes the current operating state of the motorized conveyor roller and may also contain other information present in the control unit, and this self state signal transmitted from the motorized conveyor roller by the control unit is received by other motorized conveyor rollers installed in the conveyor device as a state signal and serves for these to control their respective drive unit.

According to a first preferred embodiment, provision is made for the axle element to be designed as a hollow axle and to be designed to be fastened in a conveyor roller frame in a manner fixed in terms of torque, and for a signal line to be routed through the hollow axle and to be connected to the control unit so as to transmit the control signal. According to this preferred embodiment, the axle element serves firstly as a mechanical active element and may be fastened in a conveyor roller frame in a manner fixed in terms of torque so as to support the torque of the drive unit. For this purpose, the axle element is preferably provided with an appropriate external geometry, which may be designed for example as an external cone, in order to form an appropriate frictional connection to a conveyor roller frame. As an alternative or in addition, external geometries of the axle element that have a rotationally securing action through a form-fitting connection are conceivable, for example formed as a multi-edge axle and other structures depending on the type of torque-transmitting flanged connections. The axle element is also designed as a hollow axle and thereby allows a signal line to be passed through into the roller body from outside the roller body. This allows a structure of the conveyor roller that is particularly insensitive to damage and in which only one signal line needs to be inserted externally into the hollow axle and may then be guided, in a manner protected within the hollow axle, into the roller body and from there further to the control unit. Any additional connection devices outside the roller body are thereby able to be avoided; in particular all state signals to be routed into the roller body and all state signals to be transmitted out of the roller body by the control unit may be transmitted via the signal line that is guided in the hollow axle. This allows a simultaneously robust and easy-to-assemble and easy-to-wire assembly of a conveyor device containing the conveyor roller according to the invention.

It is even more preferable for a rotary bearing of the axle element with respect to the roller body to be arranged between the control unit and an external connection of a signal line that is connected to the control unit so as to transmit the control signal. According to this embodiment, provision is made for an external connection of a signal line. A rotary bearing of the axle element with respect to the roller body is arranged between this external connection and the control unit arranged inside the roller body. This arrangement should be understood geometrically here, that is to say the signal transmission from the connection of the signal line to the control unit is routed geometrically within the axle element by this rotary bearing. Both the outer connection of the signal line and the control unit itself are typically locationally fixed, that is to say not rotatably mounted, and the roller body rotates accordingly, guided by the rotary bearing, about the axle element and the control unit. This structure allows an expedient arrangement of the rotary bearing of the roller body with a bearing distance sufficient for high loading of the roller body. This also achieves a situation whereby the control unit is able to be placed inside the roller body in an expedient and protected manner.

According to a further preferred embodiment, provision is made for the control unit to be designed to receive a sensor signal from a sensor arranged outside the roller body and/or a self state signal from another motorized conveyor roller as state signal and for the control unit to be designed to generate the control signal on the basis of this sensor signal and/or this self state signal. According to this preferred embodiment, two types of state signal are provided, and the control unit is accordingly designed for this. The state signal may firstly be a sensor signal that thus contains a sensor value from a sensor that is arranged outside the roller body. This sensor signal may be an analog or digital signal, and the control unit may be designed to process a correspondingly analog or digital signal.

By way of example, the signal from a light barrier sensor that signals the presence or absence of an object in a particular region above the conveyor roller comes into consideration as sensor signal. Provision may also be made for sensor signals that contain positions or settings of sorters, diverters, raising and lowering systems or the like that are inserted into the conveying path in which the conveyor roller conveys, in the region of the conveyor roller, upstream of the conveyor roller or downstream of the conveyor roller. The state signal may also be a self state signal from another motorized conveyor roller. In this case, the control unit receives and processes a state signal that is output as self state signal by another motorized conveyor roller. This self state signal is received as state signal in the control unit.

The self state signal may in this case for example contain information about whether the other conveyor roller is or is not moving, but the self state signal may also contain information that goes beyond this about the direction of movement of the other roller, the movement duration of the other conveyor roller, the acceleration or deceleration of the other conveyor roller.

The self state signal from the other conveyor roller may furthermore also comprise data content that was transmitted to the other conveyor roller as state signal, that is to say for example sensor signals from a sensor arranged outside the other conveyer roller and that were supplied to the other conveyor roller as state signal.

Finally, the self state signal from the other motorized conveyor roller may also comprise data content that contains self state signals from a third motorized conveyor roller that are supplied to the other motorized conveyor roller. It is thereby possible, through signal-based connection of two or more conveyor rollers, by transmitting the self state signals in each of the motorized conveyor rollers coupled to one another in terms of signaling, to supply the self state signals at least to the motorized conveyor roller located directly downstream and possibly directly upstream, and furthermore also provide the option of the self state signals of all other motorized conveyor rollers being received in each motorized conveyor roller. This supplying of state signals in the form of multiple self state signals and, likewise alternatively or in addition, in the form of multiple sensor signals from multiple sensors arranged outside the roller body, may in particular be achieved by way of bus-based signal-based coupling of the conveyor rollers. Through appropriate addressing and identification of senders of corresponding data packets that constitute a self state signal, it is possible here to perform the data transmission between the multiple motorized conveyor rollers in a manner that is reliable and compact with regard to the scope of the data and transmission times.

It is even more preferable for the control unit to be designed to receive a digital signal as state signal and to send a digital signal as self state signal, wherein the state signal preferably has a first data structure designed for bus-based communication, having a first address data part and a first content data part, and the self state signal has a second data structure designed for bus-based communication, having a second address part and a second content data part, wherein the first data structure and the second data structure even more preferably match. A digital signal is accordingly used in each case as state signal and self state signal. Provision is in particular made for a bus-coded signal that thus has a data structure with an address data part and a content data part. A receiver provided within the bus data system or multiple receivers may in this case preferably be coded in the address data part. A sender address that characterizes the subscriber in the bus data system from which the state signal or self state signal was sent may also be coded in the address data part.

It is thus for example possible to unambiguously identify a particular sensor when this transmits a sensor signal to the bus-based data system as bus-coded state signal. A particular motorized conveyor roller that transmits a bus-coded self state signal to the bus-based data system may likewise be identified on the basis of the address data part. The state signal and the self state signal are therefore sent and received in the form of data packets. In addition to the address data part, such a data packet then also contains a content data part containing a state characteristic value or multiple state characteristic values. Such a state characteristic value may for example describe a drive characteristic. If both the state signal and the self state signal are sent and received in the form of a data structure using bus-based communication, it is particularly preferable for the data structure of the state signal and the data structure of the self state signal to match. In this case, a single bus protocol used by all subscribers within a conveyor device may be used to send and receive the corresponding self state signals and the corresponding state signals within this conveyor device, such that for example a motorized conveyor roller according to the invention installed therein is able to receive and process, as state signal, sensor signals or self state signals from sensors located outside the roller body and other motorized conveyor rollers, in the same way as this motorized conveyor roller is able to send its self state signal to other motorized conveyor rollers or other subscribers connected in the bus-based data system and receive same from these subscribers.

According to a further preferred embodiment, provision is made for the drive characteristic to be selected from an on/off state of the drive unit, a drive torque, a drive torque profile of the drive unit, a speed of the drive unit or of the roller body, a speed profile of the drive unit or of the roller body, a braking torque of the drive unit or a braking torque profile of the drive unit, or a combination of two or more of these drive characteristics. According to this development, the control signal that is transmitted by a control unit to the drive unit inside the roller body for control purposes and that is described within the self state signal is selected from multiple operating parameters of a motorized conveyor roller or its drive unit. The drive characteristic may in this case also comprise several of these operating parameters or may be formed by an operating parameter that consists of a link between two such operating parameters. The drive characteristic in this case in particular comprises operating parameters that signal whether or not the conveyor roller or the drive unit is activated, that is to say is or is not being moved, and the drive characteristic may furthermore comprise operating parameters that characterize the drive behavior, that is to say for example rotational speed, revolutions per minute, torque on the drive unit or the roller body, the respective drift over time as operating parameters characterizing the profile. The drive characteristic may also comprise unchangeable properties of the motorized conveyor roller, for example a serial number, a transmission ratio, a transmission property such as an installed plastic transmission or metal transmission, a roller body outer diameter and the like. Finally, the drive characteristic may also comprise operating parameters that reflect loading on the motorized conveyor roller, for example a temperature prevailing in the conveyor roller, a highest temperature experienced by the conveyor roller in a covered period of time, a number of operating hours of the conveyor roller and other maximum values of certain operating parameters experienced in the past by the conveyor roller, such as a maximum torque, a maximum speed and the like. The drive characteristic may furthermore comprise control parameters, for example programming characteristic values, which reflect the programming parameters with which the motorized roller is programmed. The conveyor roller may thus for example generate, as drive characteristic, a description as to whether it is operating in and programmed for single discharge or block discharge, the speed profile ramp with which it accelerates or brakes, the maximum speeds it permits and the like.

It is even more preferable for the control unit to have a storage device in which a multiplicity of drive characteristic profiles are stored, wherein each drive characteristic profile is assigned an individual binary coding and the storage device is designed to compare a received digital signal with the individual binary coding and to control the drive unit with a drive characteristic profile having an assigned individual coding that corresponds to the received digital signal.

According to this embodiment, the control unit has an electronic storage device and this storage device stores one or a number of drive characteristic profiles. These drive characteristic profiles describe a particular drive behavior of the motorized conveyor roller, for example an acceleration or a braking, a maximum speed, and may therefore generally describe the profile of the speed of the motorized conveyor roller over time. The drive characteristic profile should however also be understood to be a logic behavior of the motorized conveyor roller that sets for example a particular drive characteristic on the basis of external state signals, that is to say therefore represents logic programming of the motorized conveyor roller. Programming for operating the motorized conveyor roller in single discharge mode or in block discharge mode may thus for example be stored as a drive characteristic profile. Multiple drive characteristic profiles may in principle be stored in the storage device in order to be selected through a corresponding call by way of a digital signal, and then one of these drive characteristic profiles is applied for the operation of the motorized conveyor roller. The storage device may however also be designed such that, in the course of programming, an individual drive characteristic profile is stored there, and this individual drive characteristic profile is used for the operation of the motorized conveyor roller.

According to a further preferred embodiment, provision is made for the drive unit to comprise a brushless electric motor and for the control unit to have commutation electronics for controlling the electric motor. It is therefore in principle preferable for the control unit also to be designed to electronically commutate the electric motor in the drive unit. This avoids electronic commutation located outside the motorized conveyor roller from taking place and having to route a correspondingly large number of differentiated signals via differentiated signal lines into the roller body. Instead, the introduction of signals into the roller body, this introduction often being spatially limited, is able to take place via a few signal lines, and is therefore accordingly able to be implemented in a robust and compact manner.

According to a further aspect of the invention or a development of the conveyor roller according to the invention, provision is made for the control unit to comprise an electronic memory and to be designed to receive programming data, to store the programming data in the electronic memory and to generate the control signal on the basis of the programming data.

According to this development, the motorized conveyor roller, through its control unit, is designed to be programmed for different conveyor sequences. To this end, an electronic memory is part of the control unit and this electronic memory is designed to receive and to store programming data. These programming data describe a logic relationship between received state signals and the rules by way of which a control signal for the drive unit is generated therefrom. The motorized conveyor roller may thereby be programmed for different logic relationships between such state signals and control signals and is therefore able to be used in a large number of different variants. The programming data may in this case be stored in the electronic memory in the form of an individual program that is also used to operate the roller. As an alternative, the electronic memory may also store multiple different programming data for different modes of operation of the conveyor roller and exactly one of these stored items of programming data are used for operation through a corresponding identifier that is set by programming the control unit. This creates the possibility of selecting other programming data by transmitting another identifier value with a lower data transmission amount and using them to operate the conveyor roller.

The conveyor roller developed so as to receive and to store programming data may furthermore be developed by virtue of the control unit being designed, on the basis of the programming data, to change over between a first control signal for a first control sequence that corresponds to a single discharge mode, in which a control signal that represents a drive characteristic activating the drive unit is generated on the basis of a state signal that signals a free destination space, and a second control signal for a second control sequence that corresponds to a block discharge mode in which a control signal that represents a drive characteristic activating the drive unit is generated on the basis of a state signal that signals the activation of a drive unit of an adjacent motorized conveyor roller. According to this development, the conveyor roller is designed to change over between at least two control sequences, that is to say to perform, through a corresponding program command, either one control sequence in the form of the single discharge mode sequence or the other control sequence in the form of the block discharge mode sequence. In this case, the single discharge mode is characterized in that the conveyor roller conveys, that is to say is driven, in the conveying direction into a conveying zone located downstream whenever this adjacent conveying zone located downstream is not occupied. Simultaneous operation of the adjacent conveying zone located downstream is therefore not necessary, but may take place so as to assist with the conveying of the object. In block discharge mode, on the other hand, conveying zones adjacent to one another are operated simultaneously and may also be occupied with objects. In this case, the conveying of the objects takes place simultaneously, that is to say the object occupying the conveying zone located downstream is conveyed out and at the same time an object is conveyed into this conveying zone, which has become free, by the conveyor roller operating in block discharge mode.

Single discharge mode and block discharge mode may in principle be controlled with different state signals and self state signals. It is however possible in principle to control the single discharge mode with a state signal that signals that the adjacent conveying zone located downstream is free. The block discharge mode may on the other hand be controlled by a state signal that is generated as self state signal of the conveyor roller in the conveying zone located downstream or upstream and signals the operation in this one or other (or both) conveyor roller(s). Further state signals or self state signals may in principle be incorporated into the control, preferably a state signal that signals that the conveying zone in which the conveyor roller itself is arranged is occupied by an object or self state signals of adjacent conveyor rollers that characterize acceleration ramps, speeds and the like.

The control mode according to single discharge mode and the control sequence according to block discharge mode may in this case be stored beforehand in the memory and form the basis for the control through a corresponding programming command. The control sequences stored in the single discharge mode or block discharge mode may likewise also be transmitted to the conveyor roller through programming instructions in the programming itself and be stored in the memory, such that it is not necessary to populate the memory beforehand with these control sequences. In addition to single discharge mode and block discharge mode, other control sequences different therefrom may also be able to be programmed or stored beforehand.

Both single discharge mode and block discharge mode in this case bring about what is known as zero pressure accumulation, in which the control of the conveyor roller is implemented such that a conveyed object does not come into contact with another object located in the conveying path. This ensures damage-free conveying of the objects even over long conveying paths and a potentially high pressure accumulation force upon contact between multiple objects.

It is even more preferable in this case for the control unit to comprise an electronic memory and to be designed to receive a programming signal and, on the basis of and depending on the programming instruction, to store a logic dependency, in particular described by an algorithm, between a state signal and a drive characteristic, a logic dependency, in particular described by an algorithm, between a state signal and a drive characteristic profile, or a drive characteristic profile in the electronic memory, wherein the programming instruction is preferably digital, in particular a bus-coded programming instruction. According to this embodiment, a programming signal received by the control unit, which programming signal may be characterized by a control sequence assignment or by a programming command sequence, implements a corresponding control sequence for the conveyor roller. This implementation may take place through specific programming on the basis of the programming command sequence or may take place by virtue of a pre-programmed control sequence stored in the memory being called and assigned on the basis of the control sequence allocation. The control sequence itself may be formed by a logic dependency between a state signal and a drive characteristic, and in this case further dependencies between additional state signals and additional drive characteristics are of course also conceivable as a control sequence to be stored. Corresponding profiles of drive characteristics may likewise be stored logically in dependency on a state signal or even a state signal profile and used as a basis for the control. Finally, a programming signal may also serve to store only one drive characteristic profile that is then used by corresponding logic links for a control sequence of the conveyor roller, that is to say for example is set into a control sequence on the basis of state signals by further logic dependencies.

It is particularly preferable in this case for the programming instruction to be bus-coded. This makes it possible, on the one hand, to send the programming instruction to a bus line, and on the other hand targeted programming of particular conveyor rollers that are connected to the bus line is thereby performed.

It is even more preferable for the control unit to be designed, in an analog operating mode, to receive an analog control signal and to control the drive unit on the basis of the analog control signal, to change to a digital operating mode upon receiving a predetermined analog control signal, to receive digital control signals in the digital operating mode and to process them as a control signal or programming signal, wherein the digital control data are preferably bus-coded control data. According to this embodiment, the conveyor roller is designed to be controlled by analog input signals in an analog operating mode. Such analog input signals may for example control the speed of the conveyor roller directly as a drive characteristic on the basis of an analog input signal voltage. This property of the conveyor roller according to the invention makes it possible for the conveyor roller to be reverse-compatible in order to insert it into existing conveying paths as a component and thereby to operate in existing analog control circuits. At the same time, however, this development makes it possible for the analog-operated conveyor roller to provide additional intelligent functions to the user. To this end, the conveyor roller according to this development may be changed over to a digital operating mode. This changeover may be made from the analog operating mode by virtue of the conveyor roller using the received analog signals not only for analog control, but at the same time also evaluating them logically and in the process interpreting a particular signal sequence of the analog signal or a particular signal value or the like as an identifier that prompts the changeover from the analog mode to the digital operating mode. This changeover signal may be for example multiple switching of a conveyor direction change in a short sequence that does not occur during regular analog operating mode, or it may be a voltage value of the analog signal that is not used in the normal operating mode.

By virtue of this development, it in particular becomes possible to receive and to process additional state signals in the digital operating mode, to generate and to output self state signals or to receive programming signals and to process them so as to reprogram the conveyor roller. The conveyor roller is thereby given the ability to execute the functions outlined above in the digital operating mode. At the same time, however, the conveyor roller is also designed for an analog operating mode.

According to the invention, the conveyor roller according to the invention may be implemented in a conveyor roller arrangement having two conveyor rollers each having a control unit in accordance with the conveyor roller having a control unit outlined above. In this refinement of the invention, it is preferable for the first and the second control unit to be connected to one another by way of a digital signal line and for the first control unit of the first conveyor roller to be designed to send digital first self state data to the second control unit, and to receive digital second self state data from the second control unit and to control the drive unit of the first conveyor roller on the basis of the second self state data received from the second conveyor roller, wherein the first and second self state data are preferably bus-coded data. This conveyor roller arrangement brings about the exchange of self state data generated in one conveyor roller with the other conveyor roller, which receives and processes these self state data generated by one conveyor roller as state data in order to generate a drive characteristic for the drive unit of the other conveyor roller therefrom and to control the drive unit therewith. The two conveyor rollers may thereby control their conveyor sequences in a manner dependent on one another in terms of control and thereby perform a conveying sequence with a high degree of variance and control intelligence. This should be understood to mean that self state data that are transmitted by one conveyor roller to the other and are received at the latter may also be state data that are received in one conveyor roller and then forwarded, as self state data, from this conveyor roller to the other conveyor roller. It is thus possible for example for one conveyor roller to receive state data from a sensor and to forward these state data in the form of the sensor signals, as self state data, to the other conveyor roller. It is preferable in principle in the conveyor roller arrangement for the two conveyor rollers to be connected to one another by way of a bus line and for the self state data to be sent and received in the form of bus-coded data. This makes it possible to apply the principle of the conveyor roller arrangement with the at least two conveyor rollers to an entire conveyor device and to connect a large number of conveyor rollers to one another by way of the bus line and to exchange corresponding bus-coded data between this large number of conveyor rollers.

It is even more preferable for one conveyor roller to be arranged so as to convey a conveyed material in a first conveying zone and for the other conveyor roller to be arranged so as to convey a conveyed material in a second conveying zone, and for the first and second self state data to contain information about the presence of a conveyed material in the first conveying zone or about the presence of a conveyed material in the second conveying zone. According to this refinement, information that characterizes an occupancy property of conveying zones is exchanged as self state data. This may for example be performed such that each conveyor roller is designed such that it detects the presence of a conveyed material by processing its own data or through sensors integrated in the roller body and sends this as self state signal, or that a conveyor roller is connected in terms of signaling to a sensor that signals, as state signal, the presence of a conveyed material in that conveying zone in which this conveyor roller is arranged, and this is sent by the sensor as self state signal of the conveyor roller.

Finally, according to a further preferred embodiment, provision is made for the self state data to be selected from: self state data that describe a drive state of the drive unit of the conveyor roller, self state data that describe a sensor signal from a sensor connected to the conveyor roller, self state data that describe a control command for the drive unit of the conveyor roller. According to this development, the control unit of the conveyor roller is designed to send self state data comprising a drive state of the drive unit, a sensor signal from a connected sensor or a control command for the drive unit or to receive same. These options for sending or for receiving particular self state data constitute a basis for the control of particular control sequences, such as single discharge mode and block discharge mode, and may be used for a large number of control sequences. In this case, both data transmitted to the conveyor roller from outside the roller body may be sent and received as self state data and data generated or present in the roller body itself may be transmitted and received as such self state data.

BRIEF DESCRIPTION OF THE DRAWINGS

One preferred embodiment is explained with reference to the accompanying figures, in which.

DETAILED DESCRIPTION OF THE PREFERRED EMBODIMENTS

Figure 1:
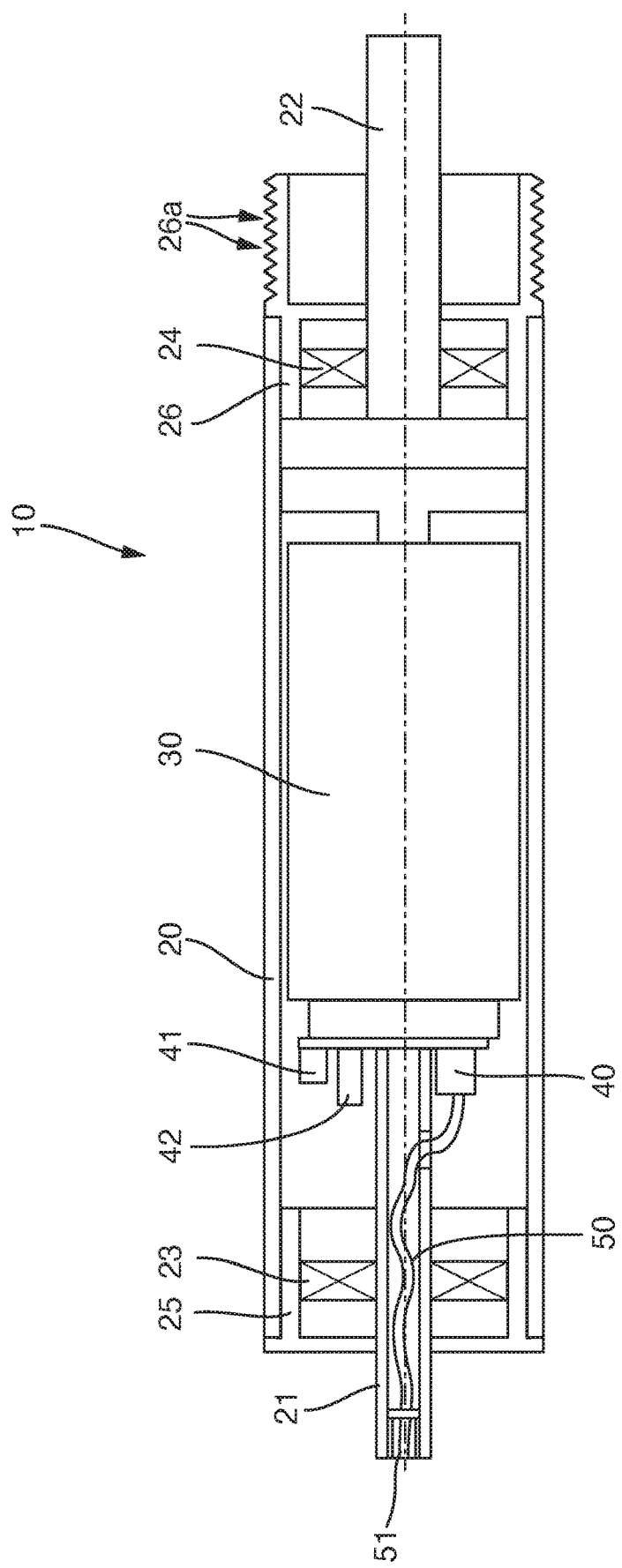
FIG. 1 shows a longitudinal sectional view of a motorized conveyor roller according to the invention.

With reference first of all to FIG. 1, what is shown is a motorized conveyor roller 10 that has a roller body 20 from the ends of which a first axle stub 21 and a second axle stub 22 respectively protrude. The motorized conveyor roller may be mounted in a frame by way of this axle stub, this frame extending along a conveying path. In this case, the two axle stubs are mounted in the frame in a manner fixed in terms of torque. The roller body 20 is mounted so as to be able to rotate about these axle stubs.

This rotatable mounting is brought about by a first roller bearing 23 that is fastened in an end cap 25 introduced at the first end of the roller body and that mounts the first roller body 20 rotatably on the first axle stub 21. Also introduced on the second end of the roller body is an end cap 26 in which there is mounted a second roller bearing 24 that mounts the roller body rotatably on the second axle stub 22. The second end cap 25 in this case additionally integrally has a circumferential surface protruding axially from the roller body and that makes it possible, through multiple circumferential grooves 26a, to transfer a torque by way of V-ribbed belts onto other adjacent conveyor rollers that do not have their own motorized drive. The motorized conveyor roller may thereby be introduced into a conveying zone containing multiple passively driven rollers and serves to drive these passively driven conveyor rollers in the conveying zone.

A drive unit 30 that is able to generate a torque between one of the two or both axle stubs and the roller body is furthermore arranged inside the roller body 20. The drive unit may comprise an electric motor that generates the torque directly and is therefore coupled fixedly in terms of torque to one or both axle stubs by the stator and is coupled fixedly in terms of torque to the roller body by the rotor. The drive unit may furthermore also comprise a transmission for stepping down the rotational speed of the electric motor and for increasing its torque. By way of example, planetary drives or spur gear units may for example be used and be inserted jointly into the torque transmission chain between the axle stub or the axle stubs and the roller body with the electric motor.

The drive unit 30 is controlled by a control unit 40 arranged inside the roller body. This control unit 40 may firstly have commutation electronics in the case of a brushless electric motor. The control unit 40 is however in particular designed to make logic control decisions on the basis of received state data that are received from outside the roller body.

For this purpose, the control unit 40 is connected to one or more signal transmitters by way of a bus line 50, these signal transmitters being arranged outside the roller body. The bus line 50 is for this purpose routed through the left-hand axle stub 21, which is designed as a hollow axle. A corresponding plug connection 51 is formed in the outer end of the axle stub 21 and is able to connect the bus line 50 to a bus line running outside the roller body and axle stub. This connection may be brought about through a sealed plug connection. This plug connection 51 firstly creates the connection to a signal bus line that serves to transmit state signals between multiple motorized conveyor rollers and sensors. The plug connection furthermore creates the connection to an energy line that provides a transmission of electrical energy for the drive unit.

The control unit 40 firstly comprises an electronic memory 41. The electronic memory 41 may firstly store unchangeable characteristic values of the motorized conveyor roller, such as its serial number or the transmission ratio of its transmission and serve to transmit data outside the conveyor roller. The electronic memory may furthermore store changeable operating parameters of the motorized conveyor roller, such as its number of operating hours, characteristic values for characterizing operating temperatures such as maximum temperature reached, and also characteristic values for characterizing rotational speeds, torques and the like. These changeable operating parameters may likewise serve to be transmitted out of the roller body in order to transmit characteristic data about the motorized conveyor roller to a signal receiver located outside the roller body.

The electronic memory 41 may furthermore store one or more control sequences according to which the control unit controls the drive unit 30 on the basis of and according to a logic link between state data that are received from outside the roller body. By way of example, a control sequence for single discharge mode may thus be stored, a control sequence for block discharge mode may be stored or these two types of control sequences may be stored with different conveying speeds, acceleration ramps and the like. These different control sequences are able to be programmed into the control unit 40 either externally through a corresponding supply of data, and the control unit is designed accordingly to be programmed. As an alternative, the control sequences may also be stored in the electronic memory 41 and be read from the electronic memory 41 by the control unit by receiving a corresponding call command and then used for the control sequences of the drive unit. In this case, each control sequence is assigned a corresponding call command and the control unit is designed to perform a corresponding comparison.

One or more temperature sensors 42 are furthermore arranged inside the roller body 20 and are designed to sense the temperature prevailing in the roller body and to signal this to the control unit. These temperature sensors serve to detect overloading of the roller and to allow the control unit to make an appropriate logic reaction by outputting corresponding control signals to the drive unit on the basis of temperature data.

Figure 2:
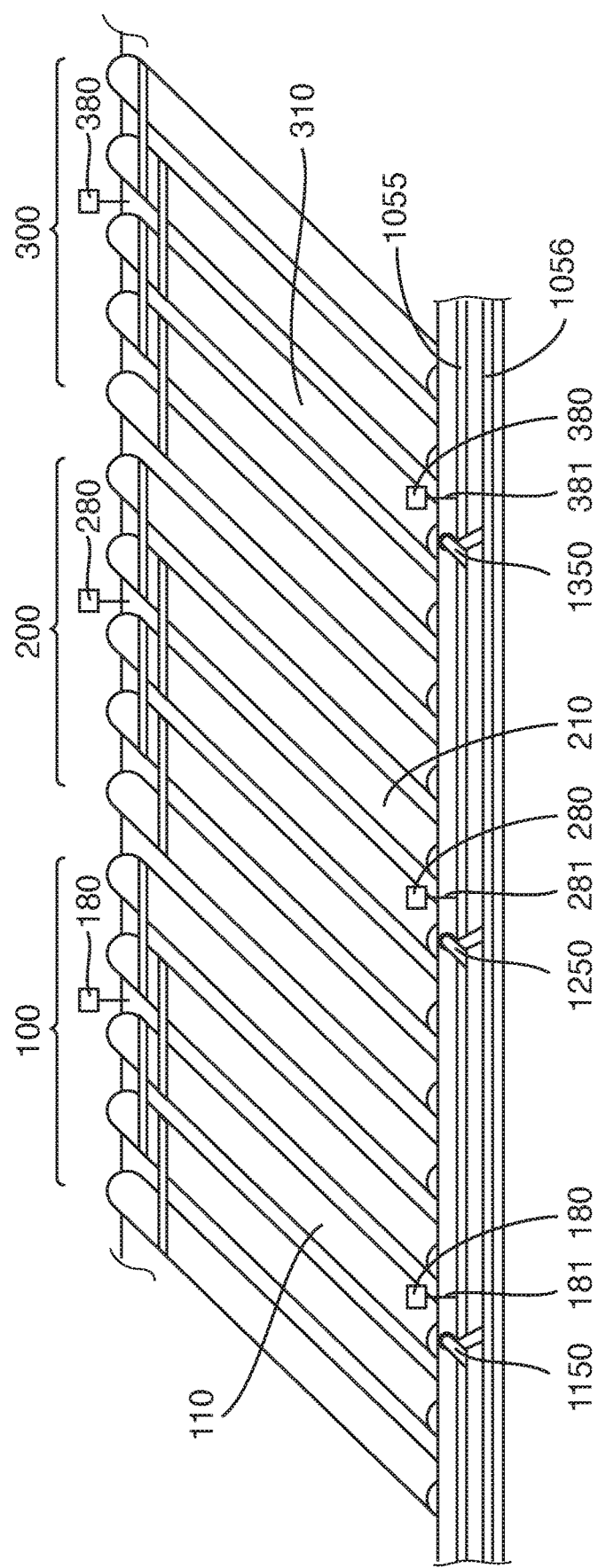
FIG. 2 shows a perspective side view of a conveying path containing multiple conveying zones, in each of which a motorized conveyor roller according to the invention is installed.

FIG. 2 shows a conveying path containing three conveying zones 100, 200, 300. Conveying zone 100 is arranged upstream of the central conveying zone 200 and conveying zone 300 is arranged downstream of the central conveying zone 200, and the conveying direction is accordingly from left to right. Each conveying zone in each case comprises a motorized conveyor roller 110, 210, 310, which each drive adjacent passively driven conveyor rollers in the respective conveying zone by way of V-ribbed belts. By controlling an individual motorized conveyor roller 110, 210, 310, the total of in each case five conveyor rollers in the respective conveying zone may therefore all be set in rotation.

Each conveying zone furthermore contains a light barrier sensor 180, 280, 380 that is able to detect the presence of an object to be conveyed in the respective conveying zone.

The motorized conveyor rollers 110, 210, 310 are connected to one another by way of a signal bus line 1055 and are thereby able to exchange data with one another. By virtue of the signal bus line 1055, self state data that are generated by one of the motorized conveyor rollers are accordingly able to be fed into the bus line 1055 from the roller body of this respective conveyor roller and received by the other motorized conveyor rollers as state data from the signal bus line 1055. Each motorized conveyor roller is connected to the signal bus line 1055 by way of its respective bus connection line having a plug 1150, 1250, 1350, guided through the axle stub, by way of a plug connection arranged on the outer end of the axle stub.

An energy line 1056 is furthermore laid along the motorized conveyor rollers, and each of the motorized conveyor rollers is connected to this energy line. The energy line 1056 serves to feed electrical energy into each of the motorized conveyor rollers. It is likewise connected to the inside of the roller body via the plug connection 1150, 1250, 1350 on the outer end of the axle stub, and is able to channel electrical energy to the drive unit in the respective roller body. This supply line is in this case controlled via the control unit, arranged inside the roller body, of the respective motorized roller.

The light barrier sensors 180, 280, 380 assigned to a respective conveying zone are likewise connected to the signal bus line 1055 by way of an electrical connection 181, 281, 381 and draw the electrical energy required for them to operate from this signal bus line. The sensors are in this case designed to feed bus-coded sensor signals directly into the signal bus line 1055. These sensor signals may be received by each of the motorized conveyor rollers as state signals and be processed so as to control the drive unit.

The motorized conveyor rollers accordingly receive, via the signal bus line 1055, firstly state data, which may for example be such sensor data. The control units inside the motorized conveyor rollers secondly also generate self state signals that for example contain information about whether the motorized conveyor roller is or is not rotating, is or is not being driven, further information about the type of movement, such as for example the rotational speed, torque information, motor current information and the like. These generated self state signals are fed into the signal bus line 1055 by the control unit and may be received from the signal bus line 1055 by other motorized conveyor rollers as state data. Each of the control units is therefore capable of generating the control commands for the drive unit within the motor roller on the basis of the state signals thus received.

It should be understood in principle that sensors and conveyor rollers connected to the signal bus line and also other actuators installed in the conveyor system feed bus-coded signals into the signal bus line. Such bus-coded signals are in particular characterized by an address data block that is able to characterize the signals in accordance with their origin as a sender address, is able to characterize them in accordance with their destination as a receiver address, or both. Bus signal data sent in the signal bus line 1055 may accordingly be identified by each receiver connected to the signal bus line 1055 on the basis of the address data part in accordance with their origin or their intended location or both. The information contained in the bus-coded data is then contained in a signal data part sent in addition to the address data part and may be interpreted accordingly. The bus-coded data may in particular be transmitted in the form of data packets.

Figure 3:
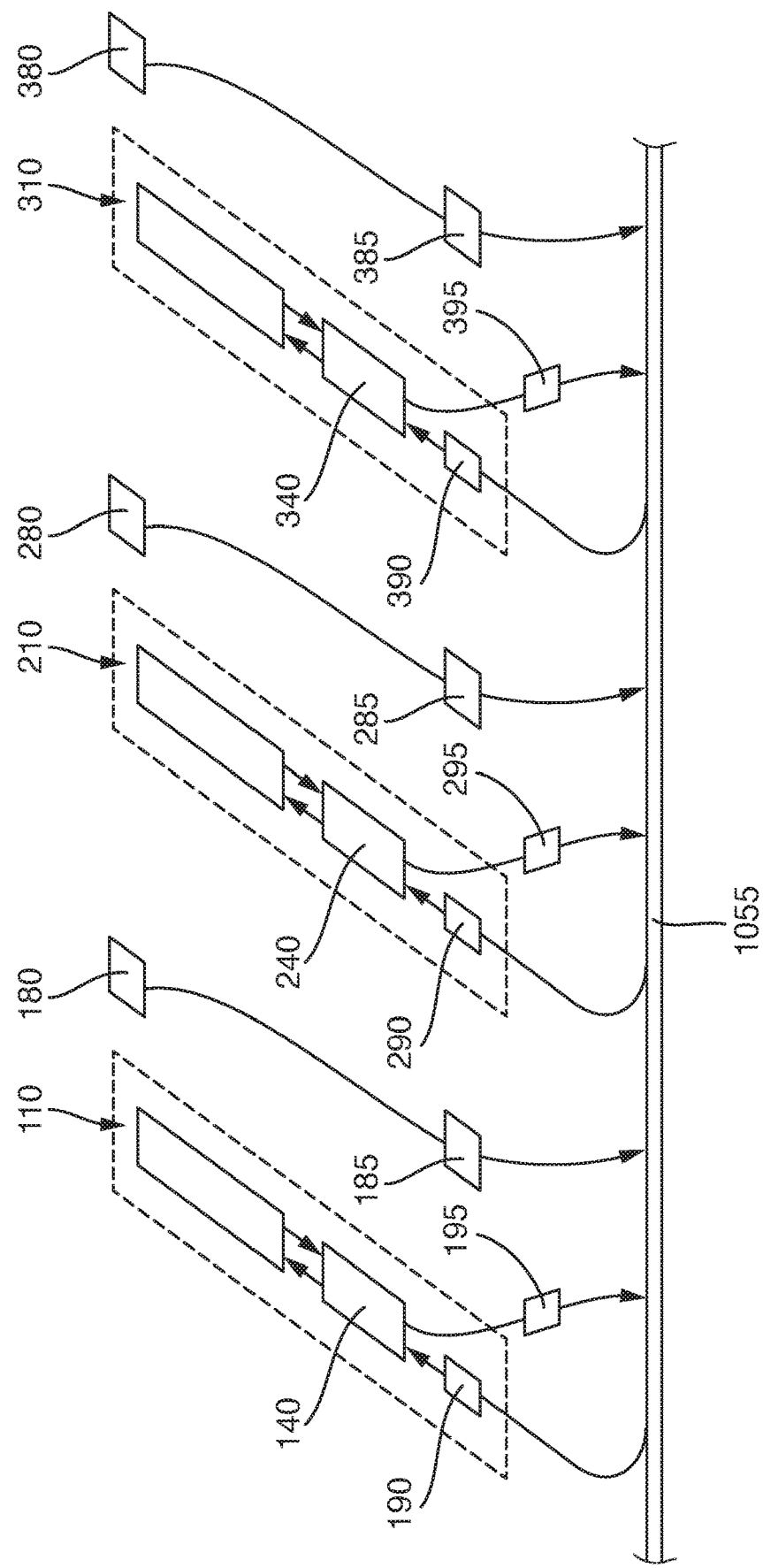
FIG. 3 shows a schematic flowchart of the transmitted data inside and outside three motorized conveyor rollers that are installed in a conveyor path in a manner adjacent to one another.

FIG. 3 shows the schematic data exchange between three adjacent conveyor rollers 110, 210, 310. The components arranged inside the conveyor roller body and taking part in the data transmission are in this case enclosed by interrupted lines, and the signal routing paths arranged outside the conveyor roller body are identified by way of unbroken lines.

As is able to be seen from this, sensors 180, 280, 380 arranged outside the roller body deliver state data in the form of sensor data 185, 285, 385 into the signal bus line 1055, these sensor data characterizing the presence or absence of an object to be conveyed at a particular location, for example in a particular conveying zone.

Each control unit furthermore transmits self state data 195, 295, 395 that describe a self state of the respective conveyor roller to the signal bus line 1055. The self state data 195, 295, 395 may for example contain information about whether the conveyor roller is or is not moving and the speed at which the conveyor roller is moving.

These sensor data 185, 285, 385 and the self state data 195, 395 of other conveyor rollers are received by a motorized conveyor roller 210 as state data 290 and processed logically in its control unit 240.

This logic processing may for example take place in such a manner that the control unit, which receives information from one sensor 280 that signals the presence of an object to be conveyed in its own conveying zone, that is to say the one in which this motorized roller 210 is installed, and at the same time receives information about the absence of an object to be conveyed in the conveying zone located downstream thereof from another sensor 380, transmits a drive command to convey the object into the conveying zone located downstream to the drive unit of this motorized conveyor roller 210 when the control unit is in a mode programmed for single discharge mode.

In another programming mode of the control unit 240 for performing a block discharge mode, the control unit 240 will control the drive so as to convey an object when it receives, through the sensor 280 assigned to its own conveying zone, a sensor signal as state signal that signals the presence of an object to be conveyed in its own conveying zone and at the same time through the motorized conveyor roller 110 located upstream that generates a self state signal 195 and that has been received as state signal 290 that signals the starting of this conveyor roller located upstream.

The invention claimed is:

1. A motorized conveyor roller, comprising:
    a roller body mounted so as to be able to rotate about a roller axle,
    a drive unit arranged inside the roller body and designed to generate a rotational movement about the roller axle between an axle element and the roller body,
characterized by a control unit that is arranged inside the roller body and that is designed
    to receive a state signal from outside the roller body,
    to generate a control signal that describes a drive characteristic on the basis of the state signal,
    to control the drive unit by way of the control signal,
    to generate a self state signal that describes the state signal and/or the drive characteristic, and
    to transmit this self state signal outside the roller body, and
characterized in that the control unit is designed to receive
    a sensor signal from a sensor arranged outside the roller body and/or
    a self state signal from another motorized conveyor roller as state signal and the control unit is designed to generate the control signal on the basis of this sensor signal and/or this self state signal,
    wherein the control unit is designed to receive a digital signal as state signal and to send a digital signal as self state signal,
    wherein the state signal has a first data structure designed for bus-based communication, having a first address data part and a first content data part and the self state signal has a second data structure designed for bus-based communication, having a second address data part and a second content data part.

2. The conveyor roller as claimed in claim 1,
    characterized in that the axle element is designed as a hollow axle and is designed to be fastened in a conveyor roller frame in a manner fixed in terms of torque, and in that a signal line is routed through the hollow axle and is connected to the control unit so as to transmit the control signal.

3. The conveyor roller as claimed in claim 1,
    characterized in that a rotary bearing of the axle element with respect to the roller body is arranged between the control unit and an external connection of a signal line that is connected to the control unit so as to transmit the control signal.

4. The conveyor roller as claimed in claim 1,
    characterized in that the control unit has at least one operating mode in which it is designed to receive a digital state signal.

5. The conveyor roller as claimed in claim 1,
characterized in that the drive characteristic is selected from:
an on/off state of the drive unit,
a drive torque,
a drive torque profile of the drive unit,
a speed of the drive unit or of the roller body,
a speed profile of the drive unit or of the roller body,
a braking torque of the drive unit, or
a braking torque profile of the drive unit,
or a combination of two or more of these drive characteristics.

6. A motorized conveyor roller, comprising:
a roller body mounted so as to be able to rotate about a roller axle,
a drive unit arranged inside the roller body and designed to generate a rotational movement about the roller axle between an axle element and the roller body,
characterized by a control unit that is arranged inside the roller body and that is designed
to receive a state signal from outside the roller body,
to generate a control signal that describes a drive characteristic on the basis of the state signal,
to control the drive unit by way of the control signal,
to generate a self state signal that describes the state signal and/or the drive characteristic, and
to transmit this self state signal outside the roller body, and
characterized in that the control unit is designed to receive
a sensor signal from a sensor arranged outside the roller body and/or
a self state signal from another motorized conveyor roller
as state signal and the control unit is designed to generate the control signal on the basis of this sensor signal and/or this self state signal
wherein the control unit has a storage device in which a drive characteristic profile or a plurality of drive characteristic profiles are stored, wherein each drive characteristic profile is assigned an individual binary coding, and in that the storage device is designed to compare a received digital signal with the individual binary coding and to control the drive unit with a drive characteristic profile having an assigned individual coding that corresponds to the received digital signal.

7. The conveyor roller as claimed in claim 1,
characterized in that the drive unit comprises a brushless electric motor and the control unit comprises commutation electronics for controlling the electric motor.

8. The conveyor roller as claimed in claim 1,
characterized in that the control unit comprises an electronic memory and is designed
to receive programming data,
to store the programming data in the electronic memory, and
to generate the control signal on the basis of the programming data.

9. A motorized conveyor roller comprising
a roller body mounted so as to be able to rotate about a roller axle,
a drive unit arranged inside the roller body and designed to generate a rotational movement about the roller axle between an axle element and the roller body,
characterized by a control unit that is arranged inside the roller body and that is designed
to receive a state signal from outside the roller body,
to generate a control signal that describes a drive characteristic on the basis of the state signal,
to control the drive unit by way of the control signal,
to generate a self state signal that describes the state signal and/or the drive characteristic, and
to transmit this self state signal outside the roller body, characterized in that the control unit comprises an electronic memory and is designed
to receive programming data,
to store the programming data in the electronic memory, and
to generate the control signal on the basis of the programming data, and
characterized in that the control unit is designed, on the basis of the programming data, to change over between
a first control signal for a first control sequence that corresponds to a single discharge mode, in which a control signal that represents a drive characteristic activating the drive unit is generated on the basis of a state signal that signals a free destination space, and
a second control signal for a second control sequence that corresponds to a block discharge mode, in which a control signal that represents a drive characteristic activating the drive unit is generated on the basis of a state signal that signals the activation of a drive unit of an adjacent motorized conveyor roller.

10. The conveyor roller as claimed in claim 8,
characterized in that the control unit comprises the electronic memory and is designed to receive a programming signal and, on the basis of and depending on the programming instruction, to store
a logic dependency, described by an algorithm, between a state signal and a drive characteristic,
a logic dependency, described by an algorithm, between a state signal and a drive characteristic profile, or
a drive characteristic profile
in the electronic memory.

11. The conveyor roller as claimed in claim 1,
characterized in that the control unit is designed,
in an analog operating mode, to receive an analog control signal and to control the drive unit on the basis of the analog control signal,
to change to a digital operating mode upon receiving a predetermined analog control signal,
to receive digital control data in the digital operating mode and to process them as a control signal or programming signal.

12. A conveyor roller arrangement having at least one first conveyor roller having a first control unit and a second conveyor roller having a second control unit,
said first conveyor roller and said second conveyor roller each comprising
a roller body mounted so as to be able to rotate about a roller axle,
a drive unit arranged inside the roller body and designed to generate a rotational movement about the roller axle between an axle element and the roller body,
and said first control unit, arranged inside the roller body of the first conveyor roller, and said second control unit, arranged inside the roller body of the second conveyor roller, each designed
to receive a state signal from outside the roller body,
to generate a control signal that describes a drive characteristic on the basis of the state signal,
to control the drive unit by way of the control signal,
to generate a self state signal that describes the state signal and/or the drive characteristic, and to transmit this self state signal outside the roller body, characterized in that the first and the second control unit are connected to one another by way of a digital signal line and the first control unit of the first conveyor roller is designed to send digital first self state data to the second control unit, and to receive digital second self state data from the second control unit and to control the drive unit of the first conveyor roller on the basis of the second self state data received from the second conveyor roller.

13. The conveyor roller arrangement as claimed in claim 12,
characterized in that one conveyor roller is arranged so as to convey a conveyed material in a first conveying zone and the other conveyor roller is arranged so as to convey a conveyed material in a second conveying zone, and in that the first and second self state data contain information about the presence of a conveyed material in the first conveying zone or about the presence of a conveyed material in the second conveying zone.

14. The conveyor roller arrangement as claimed in claim 12,
characterized in that the self state data are selected from:
self state data that describe a drive state of the drive unit of the conveyor roller,
self state data that describe a sensor signal from a sensor connected to the conveyor roller,
self state data that describe a control command for the drive unit of the conveyor roller.

15. A motorized conveyor roller, comprising:
a roller body mounted so as to be able to rotate about a roller axle,
a drive unit arranged inside the roller body and designed to generate a rotational movement about the roller axle between an axle element and the roller body,
characterized in that the control unit is designed to receive
a sensor signal from a sensor arranged outside the roller body and/or
a self state signal from another motorized conveyor roller as state signal and the control unit is designed to generate the control signal on the basis of this sensor signal and/or this self state signal,
wherein,
the control unit comprises an electronic memory and is designed
to receive programming data,
to store the programming data in the electronic memory, and
to generate the control signal on the basis of the programming data.

* * * * *